United States Patent
Michaeli et al.

(10) Patent No.: US 8,496,983 B2
(45) Date of Patent: Jul. 30, 2013

(54) COMBINED PARTICULATE SOLID AND LIQUID CONTAINER AND METHOD OF USING SAME

(75) Inventors: Susan Rybar Michaeli, Miami Beach, FL (US); Roberto Tomas Rybar, Guatemala (GT)

(73) Assignee: Guateplast S.A., Guatemala (GT)

( * ) Notice: Subject to any disclaimer, the term of this patent is extended or adjusted under 35 U.S.C. 154(b) by 930 days.

(21) Appl. No.: 12/235,924

(22) Filed: Sep. 23, 2008

(65) Prior Publication Data

US 2010/0075000 A1   Mar. 25, 2010

(51) Int. Cl.
  *B65D 81/18*   (2006.01)
  *B65D 25/08*   (2006.01)
(52) U.S. Cl.
  USPC ........... 426/109; 426/115; 426/112; 426/394; 426/519; 426/619; 206/221; 206/219; 220/592.01; 220/522; 220/521; 220/254.2
(58) Field of Classification Search
  USPC .................. 206/221, 219, 222; 426/393–394, 426/120, 106, 109, 112, 115, 130, 519, 524, 426/619–621; 220/215, 521–522, 592.01, 220/254–256, 4.27; 62/457.1–457.5; 406/106, 406/109, 120
  See application file for complete search history.

(56) References Cited

U.S. PATENT DOCUMENTS

| | | | |
|---|---|---|---|
| 1,030,325 A * | 6/1912 | Peoples et al. ................ | 220/521 |
| 1,720,935 A | 7/1929 | Tressel | |
| 2,672,232 A | 3/1954 | Kessell, Jr. | |
| 2,745,642 A | 5/1956 | Hermann | |
| 3,288,052 A | 11/1966 | Hough | |
| 3,603,485 A | 9/1971 | Vivier | |
| 3,821,425 A | 6/1974 | Russell | |
| 4,494,654 A | 1/1985 | Gunther et al. | |
| 4,634,003 A | 1/1987 | Ueda et al. | |
| 4,793,475 A | 12/1988 | Itzel | |
| 4,874,618 A | 10/1989 | Seaborne et al. | |
| 5,035,320 A | 7/1991 | Plone | |
| 5,076,425 A | 12/1991 | Plone | |
| 5,128,104 A | 7/1992 | Murphy et al. | |
| 5,147,337 A | 9/1992 | Plone | |
| 5,547,275 A | 8/1996 | Lillelund et al. | |
| 5,676,244 A | 10/1997 | Green et al. | |
| 5,871,116 A | 2/1999 | Picchietti | |
| 5,944,175 A | 8/1999 | Albisetti | |
| 5,997,814 A | 12/1999 | Minerovic et al. | |
| 6,036,004 A | 3/2000 | Bowen | |
| 6,062,381 A | 5/2000 | Paley et al. | |
| 6,068,865 A | 5/2000 | Lee et al. | |
| 6,073,795 A | 6/2000 | Longstreth | |
| 6,254,907 B1 | 7/2001 | Galomb | |
| 6,302,268 B1 | 10/2001 | Michaeli | |
| 6,488,974 B1 | 12/2002 | Kuehner et al. | |
| 6,598,418 B2 * | 7/2003 | Holley, Jr. .................... | 62/457.3 |
| 2001/0043972 A1 | 11/2001 | Tomlinson | |

(Continued)

*Primary Examiner* — Drew Becker
*Assistant Examiner* — Luana Z Long
(74) *Attorney, Agent, or Firm* — Cahn & Samuels, LLP (57) ABSTRACT

A combined particulate solid and liquid container includes a base for holding a particulate solid; and a top removably attached to the base. The top includes a reservoir for holding a liquid and has an opening defined by a lower part projecting downwardly from the reservoir. The top also includes a port door removably attached to the opening and having a thermally-conductive insert projecting upwardly from the port door and into the reservoir when the port door covers the opening.

20 Claims, 6 Drawing Sheets

U.S. PATENT DOCUMENTS

| | | |
|---|---|---|
| 2003/0087015 A1 | 5/2003 | Wyslotsky et al. |
| 2003/0116028 A1 | 6/2003 | Manuel |
| 2004/0035867 A1 | 2/2004 | Schultz et al. |
| 2004/0096551 A1 | 5/2004 | Tomlinson |
| 2004/0112368 A1 | 6/2004 | Amico |
| 2004/0265437 A1 | 12/2004 | Rianda |
| 2005/0008888 A1 | 1/2005 | Bromley et al. |
| 2006/0037485 A1 | 2/2006 | Ho |
| 2006/0185990 A1 | 8/2006 | Rybar et al. |
| 2008/0164253 A1 * | 7/2008 | Truong ........................ 220/4.27 |

* cited by examiner

COMBINED PARTICULATE SOLID AND LIQUID CONTAINER AND METHOD OF USING SAME

I. FIELD OF THE INVENTION

The present invention relates to a combined particulate solid and liquid container having a base for retaining a particulate solid, preferably dried cereal, and a top having a reservoir for holding a liquid, preferably milk, without unwanted admixing of the particulate solid and liquid prior to use. The present invention is also directed to a method of using such a container, particularly suitable for admixing dried cereal and milk.

II. BACKGROUND

U.S. Pat. No. 6,302,268 B1 discloses a container for salad that includes a base, a removable cover and a chamber insert which projects through the cover and into the container. The container is sealed by a removable cap. Pressure applied by a user to a portion of the chamber insert releases the cap and allows salad dressing which is stored in an enclosure in the chamber member to flow onto salad ingredients which are in the base. Shaking the container facilitates uniform mixing of the salad dressing with the salad ingredients. U.S. Pat. No. 6,302,268 B1 is incorporated herein by reference in its entirety.

U.S. Patent Application Publication US 2006/0185990 A1 discloses a salad container assembly including a base, a cover removably mounted on the base, and a sealed salad dressing insert for nesting within the cover having a flexible top, a salad dressing reservoir, an opening, a seal over the opening, and a puncturing mechanism capable of breaking the seal on application of sufficient pressure to the flexible top thereby allowing the contents of the reservoir to dispense into the base. U.S. Patent Application Publication US 2006/0185990 A1 is incorporated herein by reference in its entirety.

In the past, discrete single-portion cereal servings were packaged in individual boxes. Only upon actual consumption would milk be added, either by dispensing the single-portion packaged cereal into a bowl to which milk was poured or by carefully opening an individual box and adding milk in a manner to retain the milk within a moisture impervious liner.

III. SUMMARY OF THE INVENTION

It is an object of the present invention to provide a combined particulate solid and liquid container without unwanted admixing of the particulate solid and liquid prior to use.

It is another object of the invention to keep the liquid substantially hot or substantially cold until the liquid is combined with the particulate solid.

An advantage of the combined particulate solid and liquid container is that at least one of the amount of particulate solid or the amount of liquid may be user selected or preselected.

Another advantage of the combined particulate solid and liquid container is that a variety of particulate solids and liquids may be used.

A further advantage of the invention is that the combined particulate solid and liquid container is reusable.

The above objects and advantages are satisfied by a combined particulate solid and liquid container comprising a base for holding a particulate solid and a top removably attached to the base. The top includes a reservoir for holding a liquid and has an opening defined by a lower part projecting downwardly from the reservoir. The top also includes a port door removably attached to the opening and having a thermally-conductive insert projecting upwardly from the port door and into the reservoir when the port door covers the opening.

As used herein "substantially", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In this description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

V. DETAILED DESCRIPTION OF THE DRAWINGS

FIGS. 1-6D show a combined particulate solid and liquid container having a base for retaining a particulate solid, preferably dried cereal, and a top having a reservoir for holding a liquid, preferably milk, without unwanted admixing of the particulate solid and liquid prior to use. The present invention is also directed to a method of using such a container, particularly suitable for admixing dried cereal and milk.

Figure 1:
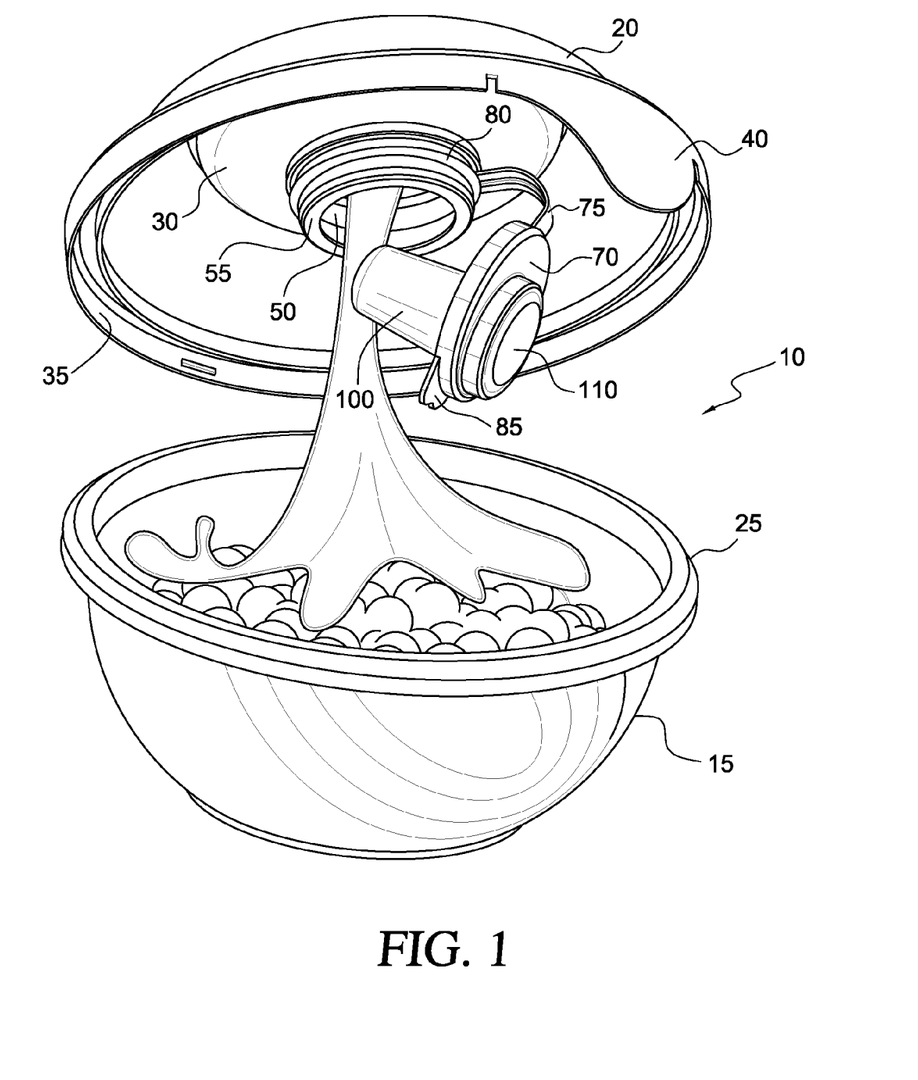
FIG. 1 shows a combined particulate solid and liquid container according to an embodiment of the present invention, particularly adapted for admixing dried cereal and milk.

As illustrated in FIG. 1, a container according to the present invention is designated 10, having a base 15 for holding a particulate solid containable within the base 15 and a top 20. The amount of particulate solid in the base may be user selected or preselected. The particulate solid may include, but is not limited to, dried cereal (for example an individual serving of dried breakfast cereal), cookies, candies, medicine, rice, grains, or the like.

The base 15 and top 20 may be of any suitable geometric configuration. In embodiments, the base 15 is substantially cup-shaped in configuration, typically having an outwardly directed-rim 25 formed along an upper circumferential edge of the base. The base 15 and top 20 are preferably radially symmetrical or substantially radially symmetrical about a central axis, thereby facilitating economical manufacture.

The top 20 is removably attached to and covers the base 15 and the particulate solid. In embodiments, the top 20 comprises a lip or groove 35 that engages the outwardly-directed rim 25 of the base to form an effective seal established by a frictional interference fit, preferably a snap fit, which prevents the top 20 from being accidentally dislodged from the base 15. The top 20 may also have a tab 40 extending downwardly from its outer edge to allow a user to easily remove the top 20 from the base 15 when desired.

Figure 2A:
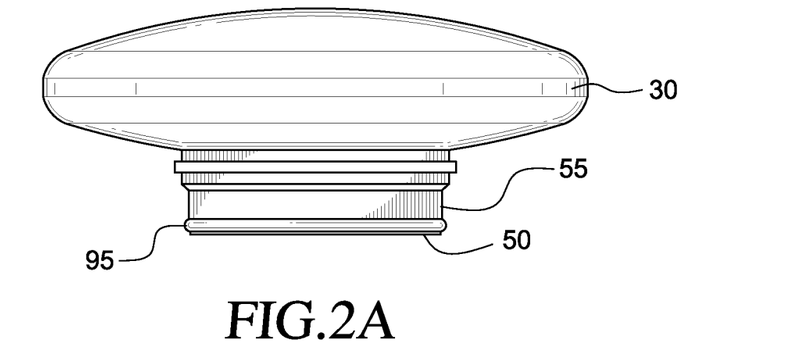
FIG. 2A shows a side view of a reservoir for holding a liquid of the container shown in FIG. 1.

The top 20 comprises an enclosure on a bottom side forming a reservoir 30 for holding a liquid. The reservoir 30 comprises a hollow, resilient member. In embodiments, the reservoir 30 may be removably affixed to the top portion 20 or may be integral with the top 20, as illustrated in FIG. 1. The reservoir 30 may be of any geometric shape, for example, substantially dome-shaped, as shown in FIG. 2A.

The reservoir 30 comprises an opening 50. The opening 50 is defined by a lower part 55 projecting downwardly from the reservoir 30. The amount of liquid in the reservoir may be user selected or preselected. The liquid may include, but it is not limited to, milk, juice, soda, yogurt, medicine, or the like.

The top 20 includes a port door 70 to cover the opening 50. The port door 70 is removably attached to the opening 50. In embodiments, the port door 70 may be attached to the lower part 55 by a leash 75 and collar member 80, with the collar around the lower part 55. The leash and collar member may be removably affixed to or integrally formed with the port door. The port door 70 may have a tab 85 to assist in affixing the port door to the lower part 55, as illustrated in FIG. 1, FIG. 2B, and FIG. 3A.

In embodiments, the port door 70 may have at least one perimetrically disposed lip 90 (illustrated in a circumferential configuration in FIGS. 3A and 3B) around a top surface or outer surface to engage mateable threads or indentations 95 disposed about or on the lower part 55 as part of a seal established by a frictional interference fit, preferably a snap fit.

Figure 2B:
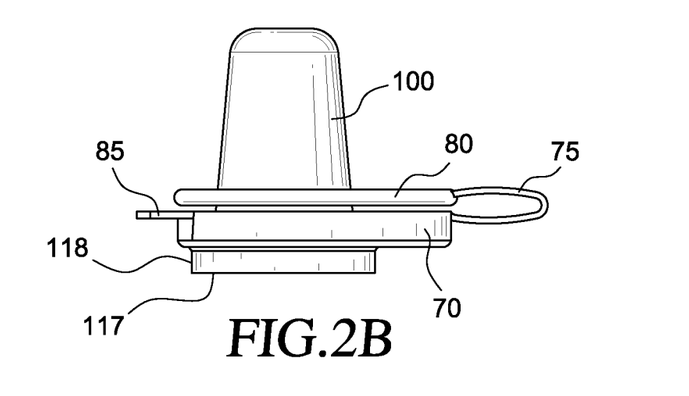
FIG. 2B shows a side view of the thermally-conductive insert and port door of the container shown in FIG. 1.
Figure 3A:
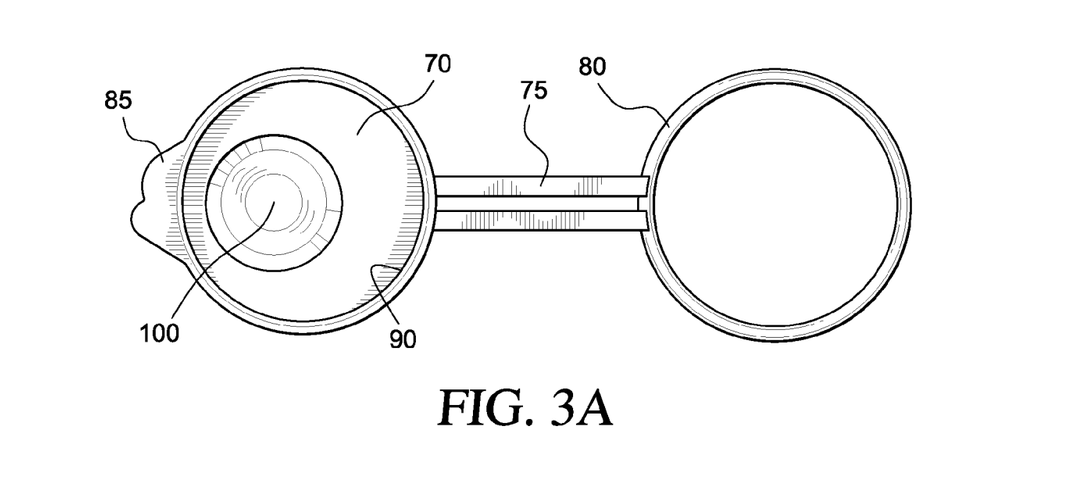
FIG. 3A shows a top view of the snap ring port door and an attached leash and collar member shown in FIG. 2B.
Figure 3B:
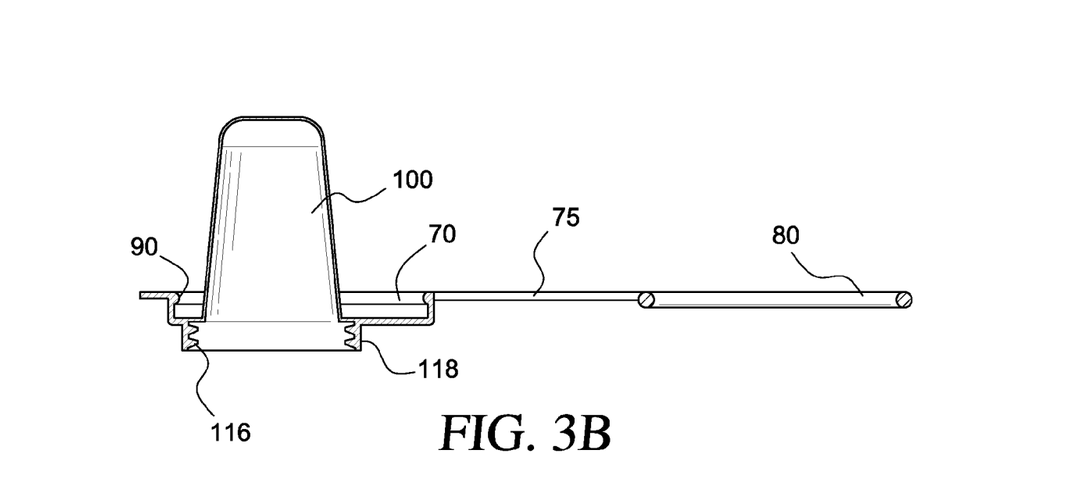
FIG. 3B shows a side cross-sectional view of FIG. 3A.
Figure 4A:
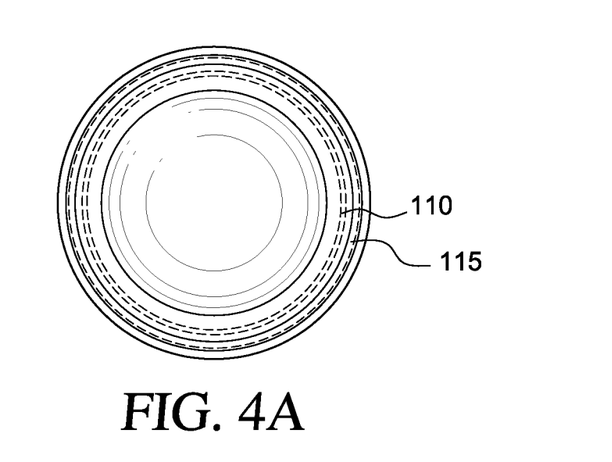
FIG. 4A shows a top view of the second port door of FIG. 2C.
Figure 4B:
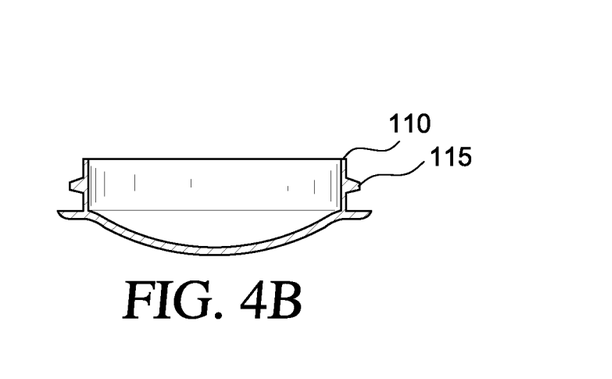
FIG. 4B shows a side cross-section view of the second port door of FIG. 2C.
Figure 4C:
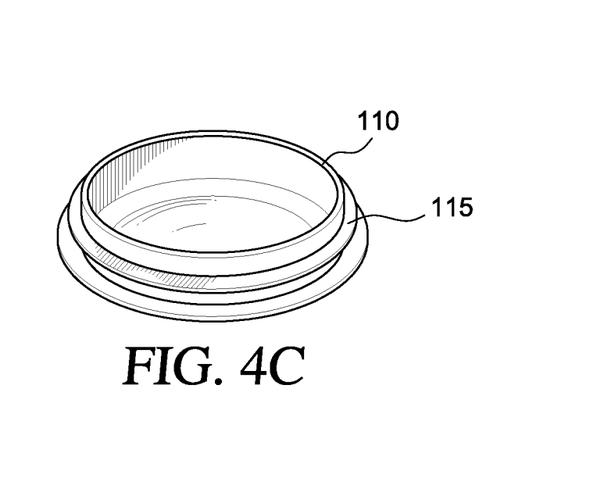
FIG. 4C shows a perspective view of the second port door shown of FIG. 2C.

As illustrated in FIG. 1, FIG. 2B, and FIG. 3A, the port door 70 includes an enclosure or insert 100 for a thermally-conductive media which is formed integrally therewith. The thermally-conductive insert 100 projects upwardly from the port door 70 so that, when port door 70 covers opening 50, the thermally-conductive insert 100 projects into the reservoir 30. An upper end of the thermally-conductive insert 100 is disposed proximate to a top surface of reservoir 30.

The thermally-conductive insert 100 contains a thermally conductive media for keeping the liquid in the reservoir 30 substantially hot or substantially cold. In embodiments, the thermally conductive media includes, but is not limited to, at least one of chilled water, ice, a thermally-insulating liquid, gel (e.g., freezing gel), a compressible solid, or any combination thereof. The thermally-conductive insert 100 retains thermal and leakage integrity during transport and temporary storage, whereby spoilage of the liquid contained therein is substantially prevented.

Figure 2C:
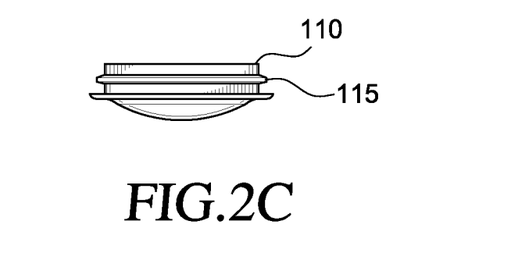
FIG. 2C shows a side view of a second port door for the thermally-conductive insert of FIG. 2B.

The thermally-conductive insert 100 comprises a second port door 110, which has a smaller cross-sectional area than the port door 70 as illustrated. As shown in FIG. 2C, the second port door 110 is adapted to functionally seal and cover opening 117 of the thermally-conductive insert 100. The second port door 110 may have perimetrically disposed threads or indentations 115 (illustrated in FIGS. 4A-4C as a circumferential configuration) to engage mateable threads or indentations 116 on opening 117 of the thermally-conductive insert 100 (illustrated in FIG. 3B). In embodiments, opening 117 is defined by a lower part 118 projecting downwardly from port door 70.

Figure 5:
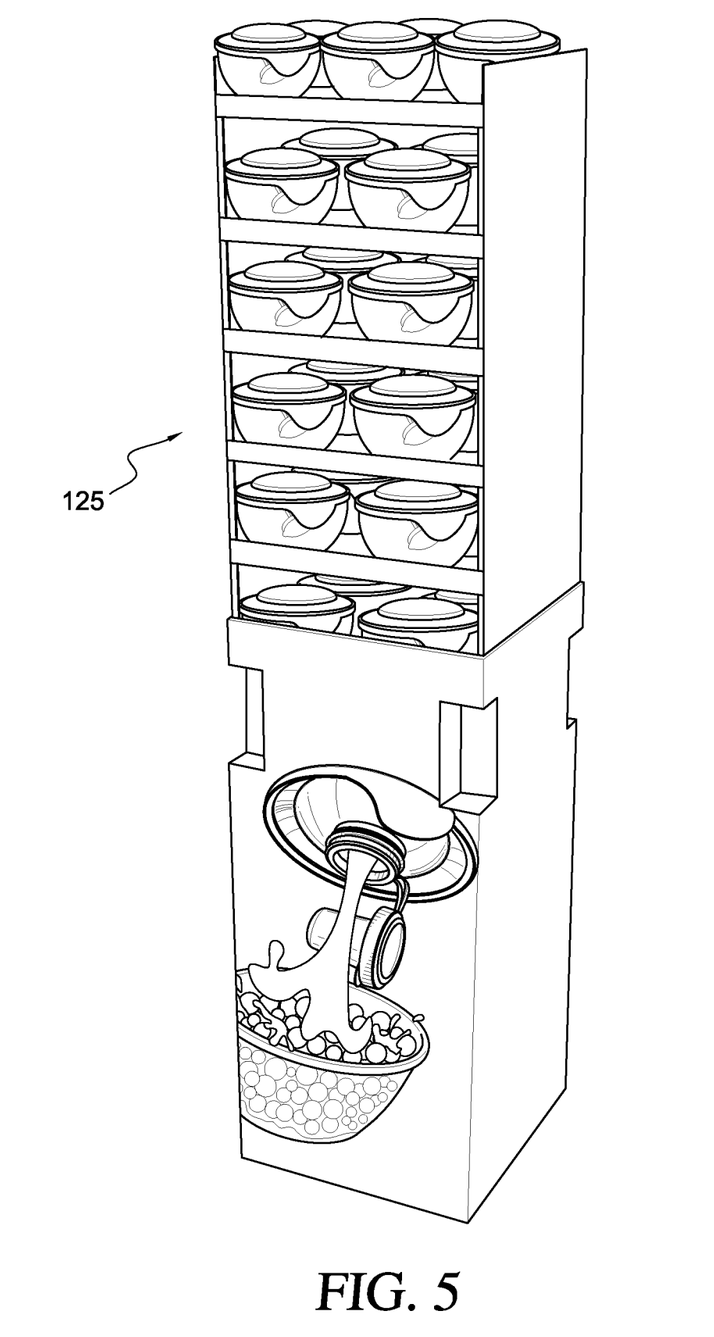
FIG. 5 shows an embodiment of the invention in the form of a stacked array of combined particulate solid and liquid containers.

The combined particulate solid and liquid container of the present invention conveniently stores and transports a fixed volume of particulate solid and a fixed volume of liquid without unwanted admixing prior to use. As illustrated in FIG. 5, the combined particulate solid and liquid containers according to the present invention may be easily stored together in an array 125.

Figure 6A:
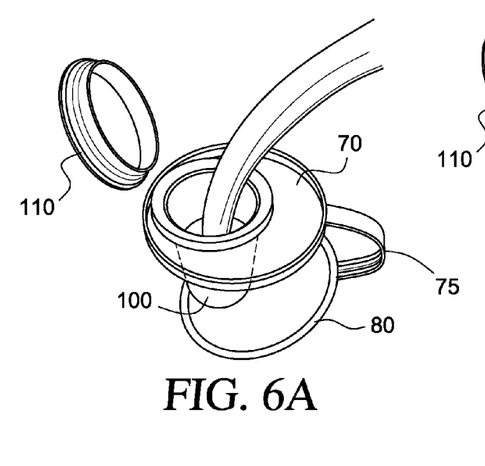
FIGS. 6A-6D show a method of filling the thermally-conductive insert and inserting it into the reservoir of the container of FIG. 1.
Figure 6B:
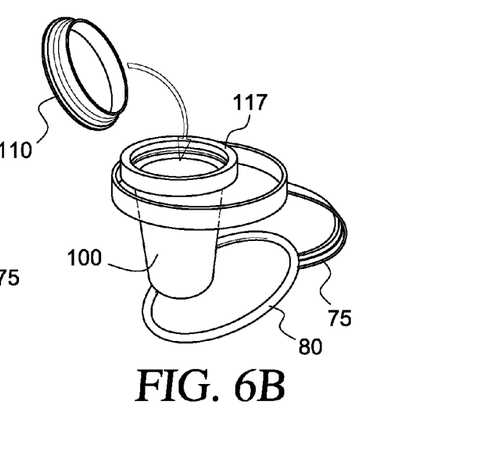
Figure 6C:
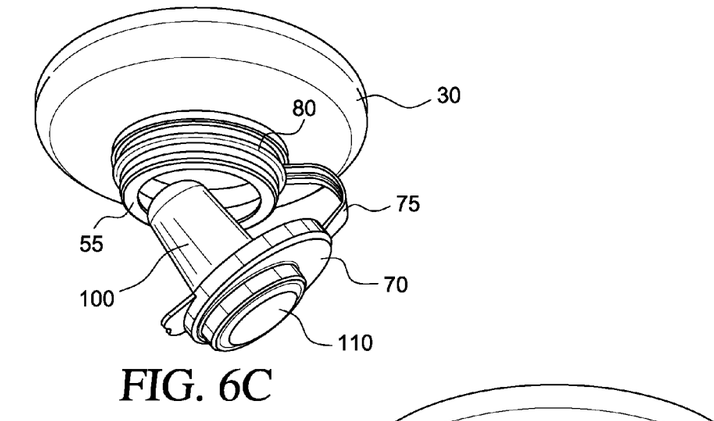
Figure 6D:
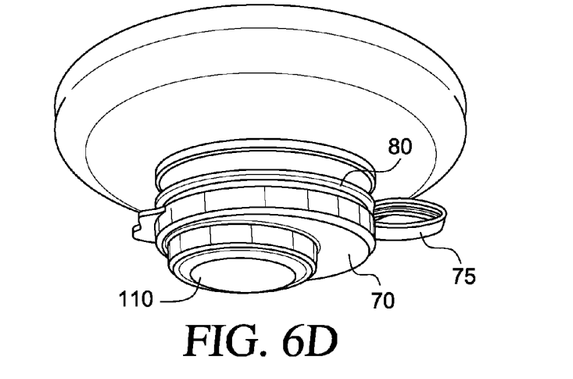

As shown in FIGS. 6A-6D, once the thermally-conductive insert 100 is ready to be filled, the second port door 110 may be removed, and the insert 100 filled with a thermally conductive media (FIG. 6A). The second port door 110 is attached to opening 117 of thermally-conductive insert 100 (FIG. 6B). The combined port door 70-insert 100-second port door 110 is attached to lower part 55 via a leash 75 and collar member 80 (FIG. 6C). The port door 70 is attached to lower part 55 thereby covering opening 50 (FIG. 6D).

According to a method of the present invention, a method of admixing a particulate solid and a liquid with the container comprises pressing downwardly on said top; dislodging the port door from the opening; and mixing the liquid with the particulate solid in the base to form a ready-to-eat composition.

According to a method of the present invention, when the top 20 is pressed in the downward direction, the liquid-containing reservoir 30 contacts the thermally-conductive insert 100, which comprises a distendable/deformable wall. Pressure on the thermally-conductive insert 100 dislodges the port door 70 from the opening 50, thereby allowing liquid (e.g., milk) to flow out of the liquid-containing reservoir 30 and onto the particulate solid (e.g., dried cereal) in the base 15. The liquid and particulate solid are mixed together to form a ready-to-eat composition, such as a breakfast cereal. The top 20 may be removed and the admixed composition may be eaten.

Although specific embodiments of the invention have been described herein, it is understood by those skilled in the art that many other modifications and embodiments of the invention will come to mind to which the invention pertains, having benefit of the teaching presented in the foregoing description and associated drawings.

It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention.

What is claimed is:

1. A combined particulate solid and liquid container, comprising:
   a base for holding a particulate solid; and
   a top removably attached to the base, said top comprising:
      a reservoir for holding a liquid comprising a lower part projecting downwardly from the reservoir towards the base and forming an opening; and
      a port door removably attached to the opening, said port door having an enclosure projecting upwardly from the port door and into the reservoir so that an upper end of the enclosure is disposed proximate to a top surface of the reservoir when the port door covers the opening,
      wherein said enclosure contains a thermally-conductive media and wherein said port door further comprises a second port door that has a smaller cross-sectional area than the port door and which is adapted to functionally seal and cover an opening of said enclosure.

2. A container according to claim 1, wherein an amount of particulate solid in the base is user selected or preselected.

3. A container according to claim 1, wherein an amount of liquid in the reservoir is user selected or preselected.

4. A container according to claim 1, wherein the particulate solid is selected from the group consisting of dried cereal, cookies, candies, medicine, rice, and grains.

5. A container according to claim 1, wherein said base holds an individual serving of dried breakfast cereal.

6. A container according to claim 1, wherein the liquid is selected from the group consisting of milk, juice, soda, yogurt, and medicine.

7. A container according to claim 1, wherein said base comprises an outwardly-directed rim along an upper circumferential edge of the base.

8. A container according to claim 7, wherein said top comprises a lip that engages the outwardly-directed rim of said base to form an effective seal established by a frictional interference fit.

9. A container according to claim 1, wherein said port door is attached to said lower part by a leash and collar member.

10. A container according to claim 1, wherein said port door comprises at least one perimetrically disposed lip around a bottom surface or an outer surface to engage mateable threads or indentations disposed about or on said lower part.

11. A container according to claim 1, wherein the thermally-conductive media comprises at least one of chilled water, ice, gel, a thermally-insulating liquid, or a compressible solid.

12. A container according to claim 1, wherein said top integrally forms the reservoir on a bottom side thereof.

13. A container according to claim 1, wherein said reservoir comprises a hollow, resilient member.

14. A container according to claim 1, wherein said second port door comprises perimetrically disposed threads or indentations to engage mateable threads or indentations on said opening of said enclosure.

15. A method of admixing a particulate solid and a liquid with the container of claim 1, comprising:
   pressing downwardly on said top;
   dislodging the port door from the opening; and
   mixing the liquid with the particulate solid in the base to form a ready-to-eat composition.

16. A method according to claim 15, wherein the particulate solid comprises dried cereal and the liquid comprises milk.

17. A container according to claim 1, wherein said base holds a particulate solid and said reservoir holds a liquid.

18. A combined particulate solid and liquid container, comprising:
   1) a cup-shaped base for holding a particulate solid; and
   2) a dome-shaped top removably attached to and covering the base, said top comprising:
      a) a first enclosure on a bottom side of the top forming a reservoir for holding a liquid, said reservoir having an opening projecting downwardly from the reservoir towards the cup-shaped base;
      b) a first port door removably attached to the opening;
      c) a second enclosure comprising a deformable wall formed integrally with and projecting upwardly from the first port door and into the reservoir so that an upper end of a second enclosure is disposed proximate to a top surface of the reservoir when the port door covers the opening,
   wherein a second enclosure comprises a second port door that has a smaller cross-sectional area that than of the first port door, and
   wherein a second enclosure contains a thermally-conductive media.

19. A combined particulate solid and liquid container according to claim 18, where in the second port door covers a lower part projecting downward from the first port door and forming an opening.

20. A method of admixing a particulate solid and a liquid with the container of claim 18, comprising:
   pressing downwardly on said top;
   dislodging the port door from the opening; and
   mixing the liquid with the particulate solid in the base to form a ready-to-eat composition.

* * * * *